United States Patent [19]

Meister

[11] 4,266,610

[45] May 12, 1981

[54] SULFONATE-COSURFACTANT MIXTURES FOR USE IN HARD BRINES DURING OIL RECOVERY OPERATIONS

[75] Inventor: John J. Meister, Gainesville, Fla.

[73] Assignee: Phillips Petroleum Company, Bartlesville, Okla.

[21] Appl. No.: 964,399

[22] Filed: Nov. 28, 1978

[51] Int. Cl.$^3$ .............................................. E21B 43/22
[52] U.S. Cl. ................................ 166/273; 252/8.55 D
[58] Field of Search ................... 252/855 D; 166/273, 166/275

[56] References Cited

U.S. PATENT DOCUMENTS

| 3,493,048 | 2/1970 | Jones | 166/275 X |
|---|---|---|---|
| 3,500,924 | 3/1970 | Poettmann | 166/274 |
| 3,508,612 | 4/1970 | Reisberg et al. | 166/274 |
| 3,637,494 | 1/1972 | Sullivan | 252/8.55 |
| 3,734,187 | 5/1973 | Norton et al. | 166/275 |
| 3,768,560 | 10/1973 | Hill et al. | 166/274 |
| 3,811,505 | 5/1974 | Flournoy et al. | 166/274 |
| 3,827,496 | 8/1974 | Schroeder | 166/274 X |
| 3,856,656 | 1/1975 | Flournoy et al. | 166/274 |
| 4,021,356 | 5/1977 | Kudchadker et al. | 252/8.55 |

Primary Examiner—Herbert B. Guynn

[57] ABSTRACT

Alkyl vinyl ether-maleic anhydride copolymers, alone or in combination with ethoxylated acids and/or ethoxylated amides and, optionally, together with polyalkoxylated carboxylic acids, polyalkoxylated amides and sulfated derivatives thereof, ethoxylated alkyl phenols, ethoxylated alcohols and the corresponding sulfated derivatives, sulfated aliphatic alcohols and alkylene oxide block copolymers, are useful to stabilize sulfonate surfactants, e.g., petroleum sulfonates, e.g., for use in tertiary oil recovery.

35 Claims, 2 Drawing Figures

SULFONATE-COSURFACTANT MIXTURES FOR USE IN HARD BRINES DURING OIL RECOVERY OPERATIONS

This invention relates to the preparation of sulfonate-cosurfactant mixtures suitable for use in hard brines as in oil recovery operations. In one of its aspects the invention relates to such compositions and to their use in tertiary oil recovery.

In one of its concepts the invention provides a composition, and its use in a process for the recovery of oil as from a formation containing the same, the composition containing a 1:1 alternating alkyl vinyl ether-maleic anhydride copolymer, e.g., 1:1 alternating methyl vinyl ether-maleic anhydride copolymer. In another of its concepts the composition, which is prepared and used in an oil recovery operation as described herein, also will contain at least one of an ethoxylated acid and an ethoxylated amide. In a further concept of the invention the compositions will comprise at least one of a polyalkoxylated carboxylic acid and a polyalkoxylated amide and sulfated derivatives thereof. In a still further concept of the invention the compositions will contain at least one of an ethoxylated alkyl phenol, ethoxylated alcohol and corresponding sulfated derivatives, a sulfated aliphatic alcohol and alkylene oxide block copolymer.

As known, increasing efforts are being made to develop improved compositions for the recovery by way of a tertiary recovery operation of oil remaining in formations after primary and secondary operations have become impossible, e.g., economically or otherwise inadvisable.

I have found that in post-primary oil recovery operations, the petroleum sulfonate-cosurfactant mixture containing additives derived from copolymers of alkyl vinyl ether and maleic anhydride either alone or in combination with ethoxylated carboxylic acids or amides in a suitable brine can be injected into an oil-bearing subterranean formation to form a microemulsion in situ to improve tertiary oil recovery or said brine-inventive additive-petroleum sulfonate-cosurfactant mixture optionally containing the ethoxylated acids or ethoxylated amides can be equilibrated with formation oil to give a microemulsion and said microemulsion can be injected to improve tertiary oil recovery. The surfactant-containing slug can be optionally preceded by an aqueous preflush followed by thickened water and aqueous drive fluid. It is contemplated that the inventive surfactant systems can be advantageously used in connate water containing high concentrations of divalent ions such as $Ca^{++}$ and $Mg^{++}$.

It is an object of this invention to provide a new composition including a sulfonate, e.g., a petroleum sulfonate and a cosurfactant. It is another object of this invention to provide an improved process for the recovery of oil from a formation as by a tertiary oil recovery operation. It is a further object of the invention to provide a stable petroleum-containing microemulsion such that it can be produced from a formation.

Other aspects, objects and the several advantages of the invention are apparent from a study of this disclosure and the appended claims.

According to the present invention the additives derived from alkyl vinyl ether-maleic anhydride copolymers are useful in the present invention and are prepared by contacting said copolymers with solvolytic agents such as water, alcohols, ammonia and the like. Suitable copolymers are described by the formula (A)

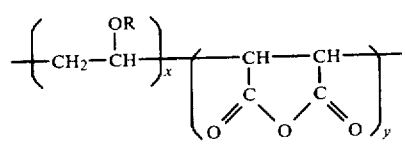

wherein x varies over the range of 5 to 50 mol percent and y varies over the range of 95 to 50 mol percent and R can be an alkyl group containing one to four carbon atoms. The presently preferred copolymer which is commercially available consists essentially of 1:1 alternating monomeric units of methyl vinyl ether and maleic anhydride.

The inventive additives derived by solvolysis of the hereinabove described copolymers can be represented by the formulas (B) and (C). The solvolyzed maleic anhydride units corresponding to formula (B) are relatively hydrophilic whereas those units corresponding to formula (C) are relatively hydrophobic. In regard to formula (B),

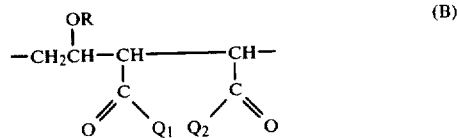

the groups $Q_1$ and $Q_2$ which are necessarily identical can be methoxy, hydroxyl, amino, or $-O^{\ominus}M^{\oplus}$ wherein M can be ammonium or alkali metal such as lithium, sodium or potassium. $Q_1$ and/or $Q_2$ can also be $-OR'$ wherein $-OR'$ is derived from ethylene glycol or polyethyleneglycols containing 4 to 100 carbon atoms. The methoxy, hydroxyl and amino bearing derivatives are formed, respectively, on contacting the selected copolymers described hereinabove (see formula A) with methanol, water and ammonia. Preferably, the methanol solvolysis yield half-ester in which, for example, $Q_1$ can represent $-OH$ and $Q_2$ can represent $-OCH_3$; the water solvolysis yields $Q_1=Q_2=-OH$, whereas ammonia solvolysis yields half-amide in which, for example $Q_1$ can represent $-NH_2$ and $Q_2$ can represent $-O^{\ominus}NH_4^{\oplus}$. In regard to formula (C),

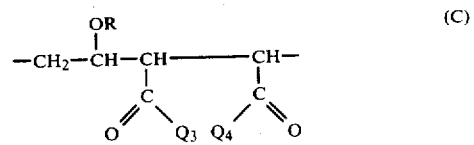

the groups $Q_3$ and $Q_4$ which are not necessarily identical can be $-OR''$ wherein $-OR''$ is derived from propylene glycol or butylene glycol or a polyalkyleneglycol such as polypropyleneglycol or polybutyleneglycol containing, respectively, 6 to 100 and 8 to 100 carbon atoms. The $-OR''$ grouping can also be derived from alkanols containing one to twenty carbon atoms or polyalkoxylated aliphatic alcohols such as $C_6$ to $C_{12}$ aliphatic alcohols combined with 3 to 12 mols of an alkylene oxide such as ethylene oxide.

The inventive additives can be conveniently generated in solution by contacting copolymers containing cyclic anhydride units with nucleophilic solvents such as water, alcohols, ammonia, amines and the like or said additives can be prepared independently by conventional polymerization techniques and the thusly prepared copolymers can be added to aqueous saline surfactant systems.

Although a variety of sulfonate surfactants can be used in the inventive stabilized composition, it is generally preferred to employ petroleum sulfonates for reasons of economy. Suitable petroleum sulfonates containing impurities such as oil, water and salts are marketed as products with 50 to 80 percent active sulfonate and an average molecular weight in the range of 350 to 500. Various petroleum oil fractions can be sulfonated to prepare the petroleum sulfonates suitable for use in the present invention. Alkyl aryl sulfonates such as dodecylbenzene sulfonate can be used in the inventive compositions but generally such materials are too expensive to be considered for large scale field applications.

Suitable optional components that can be used in the inventive compositions comprise polyalkoxylated carboxylic acids and polyalkoxylated amides as well as sulfated derivatives thereof. Said carboxylic acid and amide derivatives contain seven to twenty carbon atoms bearing 3 to 100 oxyethylene units per mol of acid or amide. Optional components are described by the formulas (D) and (E):

$$R_1CO_2(C_2H_4O)_nCH_2CH_2OH \quad (D)$$

$$R_1CONH(C_2H_4O)_nCH_2CH_2OH \quad (E)$$

wherein $R_1$ is an alkyl radical containing six to nineteen carbon atoms and n varies over the range of 3 to 100.

Additional optional components for use in the instant invention include ethoxylated alkyl phenols, ethoxylated alcohols and the corresponding sulfated, derivatives, sulfated aliphatic alcohols and alkylene oxide block copolymers. Useful ethoxylated alkyl phenols are described by the formula (F):

$$R_2-C_6H_4O(CH_2CH_2O)_nCH_2CH_2OH \quad (F)$$

wherein $R_2$ is an alkyl radical containing six to twelve carbon atoms and n is in the range of three to 100. Useful ethoxylated alcohols including the corresponding sulfated derivatives are described by the formula (G):

$$R_3O(CH_2CH_2O)_mCH_2CH_2OH \quad (G)$$

wherein $R_3$ is an alkyl radical containing six to eighteen carbon atoms and m varies over the range of three to 100. Useful sulfated alcohols contain seven to fifteen carbon atoms and the presently preferred compound is lauryl sulfate. Useful block alkylene oxide copolymers are described by the formula (H):

$$\underset{H(OCH_2CH_2)_a(OCHCH_2)_bOH}{\overset{CH_3}{|}} \quad (H)$$

wherein the ratio of a to b is greater than one with the proviso that b is two or more. In general, a and b individually vary over the range of 10 to 500.

Cosurfactants suitable for use in the present invention include the $C_3$ to $C_6$ aliphatic alcohols such as isopropanol, isobutyl alcohol, pentanols, hexanols and the like; ketones such as acetone, methylethyl ketone and the like; aldehydes such as acetaldehyde, isobutyraldehyde and the like; esters such as methyl acetate, ethyl acetate, and the like; phenolic compounds such as phenol and the cresols; and amines such as pentylamine and hexylamine. The preferred cosurfactant for use in the present composition is isobutyl alcohol.

Suitable parameters for use in the present invention are tabulated below. Since the function of the solvolyzed methyl vinyl ether-maleic anhydride copolymer is to greatly diminish or eliminate the tendency of the petroleum sulfonate to precipitate on contact with hard brines containing high concentrations of divalent ions such as $Ca^{++}$ and/or $Mg^{++}$, the molar ratio of the copolymer repeating unit to the divalent ion is critical, i.e., the molar ratio

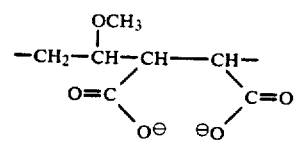

can vary over the range of 0.25:1 to 6:1 with a preferred range of 1:1 to 2.5:1.

Since the function of the protective agent is to greatly diminish or to eliminate the tendency with hard brines containing high concentrations of divalent ions such as $Ca^{++}$ and/or $Mg^{++}$, the weight ratio of the protective agent to the petroluem sulfonate in the surfactant system is important. Suitable ranges for petroleum sulfonate and protective agents are shown below.

|  | (Petroleum Sulfonate) | | (Protective Agent) | |
| --- | --- | --- | --- | --- |
|  | Broad Range | Preferred Range | Broad Range | Preferred Range |
| wt. %* | 0.01–15.0 | 2.5–7.0 | 0.01–15.0 | 0.25–3.5 |

*This weight percent is based, respectively, on the weight of active sulfonate and weight of protective agent compared to the weight of water in the surfactant system comprising brine, protective agent, petroleum sulfonate and cosurfactant.

The now preferred range for the ratio of the weight percents of the protective agent and the petroleum sulfonate is 1:10 to 50:1.

In those inventive systems in which the optional component is used, the preferred range for the ratio of the weight percent of optional additive and petroleum sulfonate is 0:10 to 50:1.

The ranges for the petroleum sulfonate, cosurfactant and salt concentration in the initially constituted surfactant system are as follows: the concentration of petroleum sulfonate in the aqueous composition is about 0.01 to 15 weight percent active ingredient based on the weight of water, preferably 2 to 5 weight percent; when used, the concentration of cosurfactant is about 1 to 7, preferably 1.5 to 4 weight percent based on the weight of water (the cosurfactant to surfactant ratio should be in the range of about 0.25:1 to 1.5:1, preferably about 0.5:1 to 1.0:1) and the concentration of salt is within the range of 250 to 100,000, more preferably 500 to 40,000, most preferably 5,000 to 25,000 parts per million total dissolved solids.

The following tabulation describes the inventive compositions in terms of broad and preferred ranges for the various components.

| Surfactant System Components | Broad Range $^a$Wt. % | Preferred Range $^a$Wt. % |
|---|---|---|
| Surfactant (e.g., petroleum sulfonates) | 0.01–15 | 2.5–7 |
| Cosurfactant (e.g., isobutyl alcohol) | 1–7 | 2–5 |
| Protective Agent [see, e.g., generic formula (A)] | 0.01–15 | 0.25–3.5 |
| Electrolyte (ppm) | 250–100,000 | 5000–25,000 |
| Cosurfactant/Surfactant (% wt. ratio) | 0.25:1–1.5:1 | 0.5:1–1:1 |
| Protective Agent/Surfactant (% wt. ratio) | 1:10–50:1 | 1:1–5:1 |
| Optional Additive/Surfactant (% wt. ratio) | 0:10–50:1 | 1:1–5:1 |
| Water | 100 | 100 |

$^a$Wt. % is based on weight of water.

In those inventive systems in which the optional component is used, the preferred range for the ratio of the weight percents of optional additive and petroleum sulfonate is 0:10 to 50:1.

The following examples demonstrate the operability of the present invention. Supporting experimental data for the present invention were obtained by the following precedures each of which is cited below:
(a) Salt Titrations
(b) Time Stability Tests
(c) Capillary Displacement Tests
(d) Phase Behavior Analysis
(e) Interfacial Tension Measurements (a) Salt Titrations p A stock solution of selected divalent metal cation-containing salt such as $CaCl_2$ or $MgCl_2$ was prepared and titrated into the inventive surfactant system comprising petroleum sulfonate and the protective inventive additive derived from methyl vinyl ether-maleic anhydride copolymer alone or in combination with an optional additive such as an ethoxylated carboxylic acid or amide. Control runs were carried out which contained petroleum sulfonate but no inventive additive. Dilution errors in the salt titration were minimized by using titrant stock solutions containing six or more weight percent divalent cations.

The salt titrations were carried out in a specially designed cell illustrated in the drawing.

Figure 1:
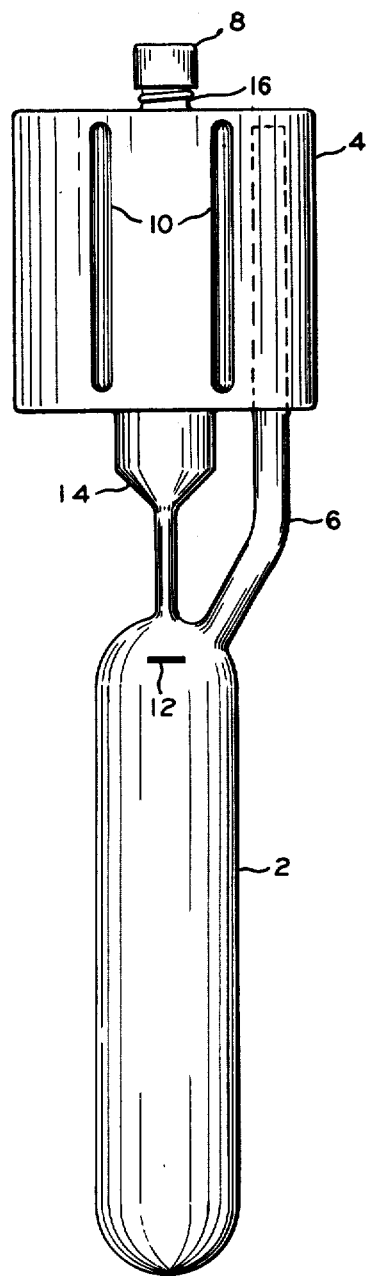
FIG. 1 is an elevational view of the phase stability cell.
Figure 2:
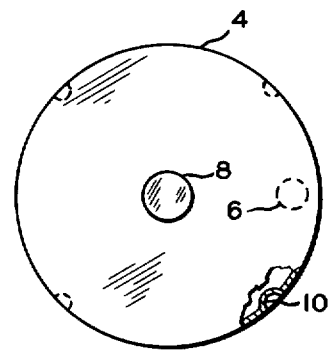
FIG. 2 is a plan view of the phase stability cell partially in cross-section.

Referring now to FIGS. 1 and 2, the cell consists of an upper flat-bottomed cylindrical compartment 4 and a lower round-bottomed cylindrical compartment 2; the bottom of said upper compartment 4 being interconnected with the top of said lower compartment 2 by an offset angular pressure equalizing tube 6 and a centrally located truncated passageway 14. Said upper compartment 4 in its top surface bears a centrally located threaded tubular opening 16 which can be sealed with a plastic cap 8.

Referring to FIG. 1, the upper flat-bottomed cylindrical compartment 4 bears four equally spaced indented stirring baffles 10 in its wall and is penetrated through its floor to approximately its full length by the offset pressure equalizing tube 6. The lower round-bottomed cylindrical compartment 2 bears a calibration mark (indicia) 12 corresponding to a lower compartment volume of 40 ml. The entire apparatus is fabricated of Pyrex glassware.

In operation, the phase stability cell is used to measure viscosity changes and determine light transmittance values for aqueous surfactant systems which are undergoing treatment with aliquots of hard brine. In general, phase stability in such systems is manifested by no or relatively small changes in viscosity and light transmittance as well as no precipitation and/or phase separation on hard brine addition. The cell is calibrated for viscosity measurements by introducing approximately 50 ml portions of individual liquids with known viscosities into compartment 2 via opening 16 and truncated passageway 14. Said 50 ml sample partially fills the upper larger diameter portion of said truncated passage 14. With the cell sealed with plastic cap 8, said cell is inverted so that the liquid of known viscosity is transferred from lower compartment 2 into the upper compartment 4 via the offset angular pressure equalizing tube 6. On returning said cell to an upright position, the liquid sample flows to lower compartment 2 through truncated passageway 14 and the time required for the liquid level in lower compartment 2 to rise to the 40 ml calibration mark (indicia) 12 is determined by a stopwatch. The procedure is repeated for any convenient number of liquids with a range of known viscosities and a plot of times and viscosities yields a calibration curve which can be used for establishing the viscosities of other liquids. Experimentally, the liquid of interest is placed in the cell as hereinabove described and the time interval required for passage of 40 ml of liquid through the truncated passage 14 is determined.

Light transmittance values of liquid samples contained in the lower compartment 2 are obtained by placing the round-bottomed cylindrical compartment 2 in the sample holder of a colorimeter and reading the transmittance.

Hard brine is added to the apparatus at 16.

The viscosity and light transmittance measurements are individually determined after each successive addition of hard brine and the procedure is continued until precipitation and/or phase separation is observed or until a maximum total volume of 50 ml of the hard brine has been added. After the addition of each hard brine aliquot the cell is sealed with plastic cap 8 and the apparatus manually shaken to effect good mixing or the cell and its contents is horizontally positioned for roller mixing. If the latter technique is used, the upper compartment 4 contacts the rollers and the lower compartment 2 is supported by insertion into an anchored teflon sleeve, said sleeve fitted loosely enough to allow free rotation of compartment 2 in said sleeve cavity during the mixing process.

During each tritration, the optical properties of the test sample were followed by the use of a colorimeter equipped with a red filter and red sensitive phototube. At a wavelength of 750 millimicrons, the transmittance reading on the colorimeter was initially set at 1.0 with the sample cell containing the surfactant system.

The untitrated sample was examined prior to the titration in regard to birefringence and viscosity. The latter property was determined by measuring the time required for 40 ml of the solution to pass from the upper compartment of the cell to the lower compartment. The viscosity corresponding to this time period was read off a calibrated chart based on times of samples with known viscosities.

The birefringence or lack thereof in the initial test sample (50 g) was determined by positioning the filled sample tube between two crossed polarized lenses mounted before a 100 watt illuminating lamp and rocking it gently. Birefringence or streaming birefringence in these samples resulted in the appearance of interferometer lines (a pattern of alternating bright and dark areas characteristic of dispersed light).

After the addition of a small aliquot of tritant to the test sample, the cell was sealed and agitated for about 50 seconds before successively determining viscosity, transmittance and birefringence as previously described. The system was then visually examined for phase separation and/or precipitation before continuing the titration. The titration was terminated after the addition of 50 ml of tritant or at the appearance of a precipitate and/or phase separation.

In the data presented hereinbelow, the so-called "half-point" of a sample refers to the titrant concentration at which the transmittance of the test mixture was one-half, i.e., 0.5, of the initial value of 1.0.

The so-called "clear zone" of a sample (as used herein) originates at a concentration corresponding to a transmittance value of 0.8.

An increase in viscosity of the test mixture during the salt titration indicated the development of a viscosification zone. The viscosity of the mixture was determined by noting the time required for 40 ml of the mixture to pass through the constriction of the titration cell.

In regard to the possible significance of the foregoing measurements and observations, it can be stated that the most promising stabilized surfactant systems exhibited high "half-points," wide birefringence zones, no viscosification zones, high phase separation points and high precipitation points.

(b) Time Stability Tests

Time stability tests at ambient temperature were carried out by placing approximately 50 g mixtures of stabilized surfactant systems in closed vials and determining transmittance, birefringence and phase stability over an extended time period. Systems which exhibited streaming birefringence in this test were considered promising candidates for oil recovery. Samples which underwent phase separation and/or precipitation were considered undesirable for further study.

(c) Capillary Displacement Tests

The capillary displacement tests can be used as a preliminary screening method to select surfactant systems suitable for tertiary oil recovery operations. This test was conducted by immersing an oil-filled capillary in a surfactant solution for a specified period of time and observing the length along the capillary bore that the surfactant has penetrated. The capillaries used in the tests were 15 cm long and sealed at one end. The capillaries were immersed horizontally in 32 ml of surfactant solution for 10 minutes and the length along the capillary bore that the surfactant solution has penetrated in the specified time is the quantitative result of the capillary displacement test. In general, oil displacement from a capillary will not occur unless interfacial tension falls below 0.5 dyne/cm for a 1.499 mm bore capillary, 0.2 dyne/cm for a 0.991 mm capillary, and 0.1 dyne/cm for a 0.0508 mm capillary.

(d) Phase Behavior Analysis (See Example IV)

One criterion which can be used to select surfactant systems for post-primary oil recovery involves the analysis of the phase behavior resulting on the equilibration of aqueous saline surfactant systems with the oil to be displaced. The phase behavior was determined by the equilibration method which involves the mixing of individual samples of a specified oil with a series of given surfactant systems prepared in brines of different salinities. The equilibrations are carried out in glass-stoppered graduated cylinders which are shaken and incubated at a specified temperature until phase volumes remain constant with time. As hereinbelow described in greater detail, the various equilibrated systems exhibit, respectively, two, three and two phases corresponding to the increasing salinity levels in the surfactant systems.

(i) Region I: Two Phases (Relatively Low Salinity):

The equilibration of the surfactant system and oil results in an upper phase consisting essentially of oil and a water rich lower phase microemulsion comprising water, surfactant, oil and cosurfactant (gamma-type microemulsion).

(ii) Region II: Three Phases (Intermediate Salinity):

The equilibration of the surfactant system and oil results in an upper phase consisting essentially of oil, a middle phase microemulsion comprising water, oil, surfactant and cosurfactant and a bottom phase comprising water (beta-type microemulsion).

(iii) Region III: Two Phases (Relatively High Salinity):

The equilibration of the surfactant system and oil results in an oil-rich upper phase microemulsion comprising water, oil, surfactant and cosurfactant and a lower phase comprising water (alpha-type microemulsion). Oil recoveries in the so-called intermediate salinity range are generally good and said recoveries are advantageously carried out at an optimal salinity whereat the interfacial tension values approach a minimum.

(e) Interfacial Tension Measurements

These measurements were carried out by standard methods known in the art.

EXAMPLE I

Salt titration results tabulated in Table 1 demonstrate that the protected surfactant system comprising methyl vinyl ether-maleic anhydride copolymer, petroleum sulfonate and water exhibited a high degree of tolerance toward relatively large concentrations of $Ca^{30+}$ and $Mg^{++}$.

TABLE 1

Salt Titration Data On Stabilized Surfactant System In Hard Brines

| Run No. | Run Type[a,b] | Titrant[c] Cation | Half-Point[c] | Birefringence Zones[c] | Phase separation Point | Precipitation Point |
|---|---|---|---|---|---|---|
| 1 | Control | $Ca^{++}$ | 268.4 | $NO^d$ | $NO^d$ | 784 |
| 2 | Invention | $Ca^{++}$ | 815.7 | 883–1149 | $NO^d$ | 32,074 |
| 3 | Control | $Mg^{++}$ | 230 | $NO^d$ | $NO^d$ | 784 |
| 4 | Invention | $Mg^{++}$ | 380 | 510–643 | $NO^d$ | 22,877 |

[a]Control samples contained 3 weight percent active Witco petroleum sulfonate TRS-10-395 in distilled water (approximate equivalent weight is 400).
[b]The inventive samples contained 3 weight percent active TRS-10-395 and an initial concentration of 2 weight percent of a 1:1 alternating copolymer of methyl vinyl ether and maleic anhydride.
[c]Titrant stock solutions contained 60,000 ppm $Ca^{++}$ or $Mg^{++}$.
[d]NO represents not observed.
[e]All values are ppm of titrant cation.

In Table I inventive run 2 demonstrates that the stabilized surfactant system was tolerant of calcuim ion concentrations of about 32,000 ppm (precipitation was observed above 32,000 ppm $Ca^{++}$) whereas the control run 1 exhibited precipitation at about 784 ppm $Ca^{++}$. Thus, the inventive system tolerated about forty times the calcium ion as did the control run. A similar comparison of the magnesium titrations showed the inventive system (run 4) to be of the order of 25 times more tolerant of $Mg^{++}$ than control run 3.

The existence of birefringence zones in the inventive runs 2 and 4 indicate that these systems would be effective in post-primary oil recovery.

EXAMPLE II

The results tabulated below indicate the improved time stability behavior of the inventive system including sulfated polyethoxylated alkyl phenol as the optional component.

TABLE II

| Run | No. Of Components[a] | $Ca^{++}$ ppm | Observations[b] |
|---|---|---|---|
| | Invention Runs | | |
| 5 | 3 | 25000 | S |
| 6 | 3 | 30000 | S |
| | Control Runs | | |
| 7 | 2 | 25000 | S |
| 8 | 2 | 30000 | U |

[a]These systems (runs 5 and 6) contained, respectively, 3 weight percent active Witco TRS-10-395 petroleum sulfonate, 2 weight percent active Alipal EP-110 (a sulfated polyethoxylated alkyl phenol) and 1 weight percent of a 1:1 alternating methyl vinyl ether-maleic anhydride copolymer; and (runs 7 and 8) 3 weight percent TRS-10-395 and 2 weight percent EP-110.
[b]S represents a phase stable system; U represnts phase instablity.
Runs 7 and 8 are representative of a two component prior art system which phase separated after 38 days in the presnce of 30,000 ppm $Ca^{++}$. The inventive three component system of run 6 was phase stable after 38 days in the presence of 30,000 ppm $Ca^{++}$.

EXAMPLE III

Capillary displacement results summarized in Table III indicate that the representative stabilized surfactant system is potentially useful for tertiary oil recovery.

TABLE III

| | Capillary Displacement Results With A Stabilized Surfactant System[x] | | | |
|---|---|---|---|---|
| Run No. | Imbibition Depth (cm) | Immersion Time (sec) | Surfactant System Composition | $Ca^{++}$(ppm) in Surfactant System |
| 9 | 15 | 537 | A[a] | 800 |
| 10 | 13.5 | 600 | A[a] | 800 |
| 11 | 9.1 | 600 | A[a] | 1200 |
| 12 | 0 | 1800 | Water | 0.0 |

[x]Decane was used in a 15 cm long closed end capillary with a radius of 749.5 microns.
[a]A represents an aqueous mixture containing one weight percent of a 1:1 alternating copolymer of methyl vinyl ether and maleic anhydride and 3 weight percent Witco TRS 10-395 petroleum sulfonate.

As shown in run 12 essentially no displacement of oil from the capillary occurred on contact with water containing no surfactant component. Runs 9, 10 and 11 with a representative stabilized surfactant system in contact with the oil-filled capillary exhibited efficient oil displacement indicating that the interfacial tension between the decane sample and stabilized surfactant system had been reduced to a very low value.

EXAMPLE IV

A representative stabilized surfactant system was equilibrated with South Cowden crude oil over a range of sodium chloride concentrations in order to study phase behavior. Seven surfactant systems were prepared which ranged from 0 to 30000 ppm in sodium chloride concentration. Each of the 50 g samples of the surfactant system contained 3.6 weight percent active petroleum sulfonate, 3 weight percent tertiary butyl alcohol, 1 weight percent of a 1:1 alternating methy vinyl ether-maleic anhydride copolymer (Gantrez AN-119) low-molecular weight grade having a specific viscosity of 0.1–0.5 as determined on a solution of 1 gram of the copolymer in 100 mL of methyl ethyl ketone at 25° C. and 1 weight percent of polyethoxylated stearic acid (Pegosperse 1000 MS in which the mean molecular weight of the ethylene oxide derived portion is approximately 1000). Each surfactant sample was individually equilibrated with 30 ml portions of South Cowden crude oil at 0; 10,000; 15,000; 16,000; 20,000; 25,000; and 30,000 ppm NaCl. The number and volume of the phases formed over the above salinity range is summarized below.

TABLE IV

| | | Volume of Phases | | | |
|---|---|---|---|---|---|
| No. of Phases | NaCl ppm | Top | Middle | Bottom | Microemulsion Type |
| 2 | 0 | 31 | None | 50 | Gamma (bottom phase) |
| 2 | 10000 | 28 | None | 53 | Gamma (bottom phase) |
| 3 | 15000 | 2 | 38 | 41 | Beta (middle phase) |
| 3 | 16000 | 2 | 40 | 39 | Beta (middle phase) |
| 3 | 20000 | 20 | 24 | 37 | Beta (middle phase) |
| 3 | 25000 | 2 | 34.5 | 44.5 | Beta (middle phase) |
| 3 | 30000 | 3 | 38 | 40 | Beta (middle phase) |

The above results show that the surfactant system on equilbration with crude oil gave three phases over the salinity range of about 15000 to 30000 ppm NaCl. These tests demonstrate that a composition according to the invention is useful to obtain good results during tertiary oil recovery.

CALCULATED EXAMPLE V

The following is a calculated example showing the use of the inventive composition in a tertiary oil recovery process. The calculation is based on the extension of actual data obtained in the laboratory and in an Oklahoma oil field. The calculation is based on the mathematical equations contained in the article, "Prediction of Polymer Performance" by J. T. Patton, K. H. Coats, and G. T. Colegrove, Soc. Pet. Eng. Jour., March, pp. 72-84 (1971), also published as S.P.E. No. 2546, 44th Ann. Meeting, Denver, Colo. (1969). The details used, together with a computer program for solving the equations of this mathematical system, were as follows:

A 5-spot flood simulation was made with the following specifications:

Inter-well distance: 467.0 feet (that is, the distance from the injection well to the production wells).

Well radius: 0.2920 foot (that is, half the diameter of the borehole).

Constant injection rate: 1000 barrels/day (that is, the injection rate of all the materials).

Total water injected before the composition of this invention is injected: 130,000 barrels (water was injected for 130 days).

Total additive composition of this invention injected: 65,000 barrels (the inventive composition is injected for 65 days). The composition consists of 2 weight percent methyl vinyl ether-maleic anhydride copolymer (1:1 alternating monomer units), 90.2 weight percent water, 4.8 weight percent petroleum sulfonate (3.6 weight percent active Phillips petroleum sulfonate), and 3.0 weight percent NaCl. Thus each barrel of the inventive surfactant fluid contains about 6.72 lb methyl vinyl ether-maleic anhydride copolymer; about 16.13 lb petroleum sulfonate, about 303.07 lb water and about 10.08 lb NaCl.

Additive retained by the reservoir; 900 pounds acre foot (this is the adsorption of surfactant by one acre foot of reservoir).

Oil viscosity in the presence of water: 3 centipoise

Oil viscosity in the slug containing the inventive composition: 3 centipoise.

Oil viscosity in the presence of the mobility buffer slug (injected behind the slug composed according to this invention): 3 centipoise.

Reservoir water viscosity: 0.6 centipoise

Viscosity of the slug containing the inventive composition: 22 centipoise.

Viscosity of the mobility buffer behind the slug containing the inventive composition: 50 centipoise (a 1.0 PV slug of 4000 ppm carboxymethylhydroxyethyl cellulose in fresh water).

Gas viscosity: 0.0120 centipoise.

Oil formation volume factor: 1.05 (that is the ratio of 1 barrel of oil under reservoir conditions to the volume of 1 barrel of oil under stock-tank conditions).

Reservoir pore volume: $3.526 \times 10^7$ cu ft. $= 0.62790 \times 10^6$ bbls.

The reservoir is divided into 6 layers based upon data obtained from oil field core samples. The properties of these layers are shown in Table V.

TABLE V

| | Thickness ft. | Absolute Permeability (Millidarcy) | Porosity | Initial Oil Saturation | Pore Volume Millions of bbls | Oil in Layer Millions of bbls |
|---|---|---|---|---|---|---|
| Layer 1 | 2.30 | 72.0 | 0.196 | 0.272 | 0.035018 | 0.0090714 |
| Layer 2 | 0.21 | 854.0 | 0.300 | 0.150 | 0.0048939 | 0.00069913 |
| Layer 3 | 3.48 | 204.0 | 0.252 | 0.206 | 0.068123 | 0.13365 |
| Layer 4 | 0.87 | 380.0 | 0.300 | 0.150 | 0.020275 | 0.0028964 |
| Layer 5 | 7.48 | 2.25 | 0.135 | 0.345 | 0.078442 | 0.025774 |
| Layer 6 | 32.66 | 21.0 | 0.166 | 0.308 | 0.42115 | 0.12354 |

The behaviors of the formation when flooded with water, a composition of this invention, and finally a polymer-viscosified agent, were determined in the laboratory by measuring the relative permeability to oil and to the respective slugs as a function of the water saturation. The results for these functions obtained in the laboratory are shown in Tables VI, VII and VIII.

TABLE VI

| Water Saturation (Fraction) | Relative Permeability to Oil Before Additive Slug | Relative Permeability to Water Before Additive Slug |
|---|---|---|
| 0.17 | 0.830 | 0.000 |
| 0.46 | 0.310 | 0.001 |
| 0.50 | 0.245 | 0.002 |
| 0.55 | 0.152 | 0.006 |
| 0.60 | 0.082 | 0.010 |
| 0.65 | 0.040 | 0.024 |
| 0.70 | 0.017 | 0.080 |
| 0.75 | 0.005 | 0.150 |
| 0.80 | 0.002 | 0.240 |
| 0.85 | 0.000 | 0.420 |

TABLE VII

| Water Saturation (Fraction) | Relative Permeability to Oil in Region of Additive Slug | Relative Permeability to Water in Region of Additive Slug |
|---|---|---|
| 0.00 | 1.00 | 0.00 |
| 0.40 | 0.3590 | 0.160 |
| 0.50 | 0.2480 | 0.2470 |
| 0.60 | 0.1510 | 0.3500 |
| 0.70 | 0.0800 | 0.4700 |
| 0.75 | 0.0580 | 0.5320 |
| 0.80 | 0.0400 | 0.5970 |
| 0.85 | 0.0250 | 0.6650 |
| 0.90 | 0.0160 | 0.7500 |
| 1.00 | 0.00 | 1.00 |

TABLE VIII

| Water Saturation (Fraction) | Relative Permeability to Oil Behind Additive Slug | Relative Permeability to Water Behind Additive Slug |
|---|---|---|
| 0.00 | 1.00 | 0.00 |
| 0.40 | 0.302 | 0.30 |
| 0.50 | 0.170 | 0.41 |
| 0.60 | 0.080 | 0.52 |
| 0.70 | 0.027 | 0.63 |
| 0.75 | 0.0142 | 0.69 |
| 0.80 | 0.0088 | 0.75 |
| 0.85 | 0.0058 | 0.81 |
| 0.90 | 0.0033 | 0.87 |
| 1.00 | 0.0 | 1.00 |

The production of this flooding process was calculated for 815 days of running time, the time steps size being 5 days.

With all these data based on the mathematics cited above, a computer calculation was carried out to determine the production of water and oil. Some typical results are shown in Table IX, assuming that the flood was started at the day 0 with an injection of 1000 barrels of water per day; that from the day 130 on, the stabilized surfactant system of this invention is injected for 65 days at a rate of 1000 barrels per day; and that from the day 196 on, a polymer-viscosified water slug of 50 centipoise is injected at a rate of 1000 barrels per day.

TABLE IX

| Time (Days) | Oil Rate (bbl/day) | Water Rate (bbl/day) |
|---|---|---|
| 0 | 0 | 0 |
| | Start Water Preflush | |
| 50 | 8.6 | 991 |
| 100 | 8.7 | 991 |
| | Start Inventive Surfactant Flood | |
| 200 | 31.8 | 967 |
| | Start Polymer-Thickened Drive Water | |
| 400 | 133 | 860 |
| 600 | 125.4 | 868 |
| 810 | 128.3 | 865 |

The cumulative oil produced in this calculated example is 86,033 stock tank barrels or 13.70% of pore volume.

In practicing the inventive process for a period of 815 days, a total of 86,033 stock tank barrels of oil were produced whereas a waterflood for a period of 815 days would have yielded 7,009 stock tank barrels of oil. The incremental oil due to the use of the stabilized surfactant system of the instant invention is 79,024 stock tank barrels. Thus, it is clearly evident that use of the inventive process results in a very effective oil recovery. The original oil in place in the flooded, 10 acre section of the reservoir was 175,346 stock tank barrels or 27.9% of pore volume. The practice of the invention recovered (86,033/175,346=) 49.1 volume percent of the original oil in place while a waterflood run for an identical time produced only (7,009/175,346=) 4 volume percent. The inventive system is clearly superior to previous art.

Reasonable variation and modification are possible within the scope of the foregoing disclosure and the appended claims to the invention the essence of which is that a sulfonate-cosurfactant mixture has been stabilized with at least an alkyl vinyl ether - maleic anhydride copolymer alone or in combination with at least one of an ethoxylated acid and an ethoxylated amide, optionally with other additives in addition to those here recited and that such stabilized compositions will equilibrate with petroleum oil to form micro-emulsions which can be recovered from oil formations as in a tertiary oil recovery operation.

I claim:

1. A petroleum sulfonate-cosurfactant system mixture containing also as a protective agent a copolymer of an alkyl vinyl ether and maleic anhydride, the alkyl containing 1–4 carbon atoms, in an amount sufficient to render the mixture stabilized in the presence of a hard brine, the brine containing 250–100,000 ppm electrolyte, the components of the system being present in ranges in amounts by weight percent as follows:

protective agent, 0.01–15 having a specific viscosity of about 0.1–0.5, as determined on a solution of 1 gram of the copolymer in 100 mL of methyl ethyl ketone at 25° C.; the petroleum sulfonate, 0.01–15; cosurfactant, 1–7: the ratio of cosurfactant to surfactant being 0.25:1–1.5:1; and the ratio of protective agent to surfactant being 1:10–50:1; the cosurfactant being selected from the group consisting of $C_3$–$C_6$ aliphatic alcohols, ketones, aldehydes, esters, phenolic compounds, and amines.

2. A mixture according to claim 1 wherein there is also present in the mixture at least one of an ethoxylated acid, an ethoxylated amide, a sulfated derivative of said acid, a sulfated derivative of said amide, an ethoxylated alkyl phenol, an ethoxylated alcohol, a sulfated aliphatic alcohol and alkylene oxide block copolymer.

3. A mixture according to claim 1 wherein the sulfonate is a petroleum sulfonate.

4. A mixture according to claim 1 wherein the copolymer is a 1:1 alternating methyl vinyl ether - maleic anhydride copolymer.

5. A mixture according to claim 4 wherein there is also present a sulfated polyethoxylated alkyl phenol.

6. A mixture according to claim 1 wherein there is also present oil and the total mixture is a stable microemulsion.

7. A mixture according to claim 2 wherein the mixture also contains oil and the total mixture is a stable microemulsion.

8. A mixture according to claim 3 wherein the mixture also contains oil and the total mixture is a stable microemulsion.

9. A mixture according to claim 4 wherein the mixture also contains oil and the total mixture is a stable microemulsion.

10. A mixture according to claim 5 wherein the mixture also contains oil and the total mixture is a stable microemulsion.

11. A process for the tertiary recovery of oil from an oil-bearing formation which comprises injecting into such formation a mixture according to claim 1 and then injecting thickened water and an aqueous drive into said formation.

12. A process for the tertiary recovery of oil from an oil-bearing formation which comprises injecting into such formation a mixture according to claim 2 and then injecting thickened water and an aqueous drive into said formation.

13. A process for the tertiary recovery of oil from an oil-bearing formation which comprises injecting into such formation a mixture according to claim 3 and then injecting thickened water and an aqueous drive into said formation.

14. A process for the tertiary recovery of oil from an oil-bearing formation which comprises injecting into such formation a mixture according to claim 5 and then injecting thickened water and an aqueous drive into said formation.

15. A process for the tertiary recovery of oil from an oil-bearing formation which comprises injecting into such formation a mixture according to claim 5 and then injecting thickened water and an aqueous drive into said formation.

16. A process for the tertiary recovery of oil from an oil-bearing formation which comprises injecting into such formation a mixture according to claim 6 and then injecting thickened water and an aqueous drive into said formation.

17. A process for the tertiary recovery of oil from an oil-bearing formation which comprises injecting into such formation a mixture according to claim 7 and then injecting thickened water and an aqueous drive into said formation.

18. A process for the tertiary recovery of oil from an oil-bearing formation which comprises injecting into such formation a mixture according to claim 8 and then injecting thickened water and an aqueous drive into said formation.

19. A process for the tertiary recovery of oil from an oil-bearing formation which comprises injecting into such formation a mixture according to claim 9 and then injecting thickened water and an aqueous drive into said formation.

20. A process for the tertiary recovery of oil from an oil-bearing formation which comprises injecting into such formation a mixture according to claim 10 and then injecting thickened water and an aqueous drive into said formation.

21. A composition according to claim 1 wherein the cosurfactant is tertiary butyl alcohol.

22. A process for the tertiary recovery of oil from an oil-bearing formation which comprises equilibrating with formation oil to give a microemulsion a mixture according to claim 1, injecting said microemulsion into said formation, then injecting thickened water and an aqueous drive into said formation.

23. A process for the tertiary recovery of oil from an oil-bearing formation which comprises equilibrating with formation oil to give a microemulsion a mixture according to claim 2, injecting said microemulsion into said formation, then injecting thickened water and an aqueous drive into said formation.

24. A process for the tertiary recovery of oil from an oil-bearing formation which comprises equilibrating with formation oil to give a microemulsion a mixture according to claim 3, injecting said microemulsion into said formation, then injecting thickened water and an aqueous drive into said formation.

25. A process for the tertiary recovery of oil from an oil-bearing formation which comprises equilibrating with formation oil to give a microemulsion a mixture according to claim 4, injecting said microemulsion into said formation, then injecting thickened water and an aqueous drive into said formation.

26. A process for the tertiary recovery of oil from an oil-bearing formation which comprises equilibrating with formation oil to give a microemulsion a mixture according to claim 5, injecting said microemulsion into said formation, then injecting thickened water and an aqueous drive into said formation.

27. A process for the tertiary recovery of oil from an oil-bearing formation which comprises equilibrating with formation oil to give a microemulsion a mixture according to claim 6, injecting said microemulsion into said formation, then injecting thickened water and an aqueous drive into said formation.

28. A process for the tertiary recovery of oil from an oil-bearing formation which comprises equilibrating with formation oil to give a microemulsion a mixture according to claim 7, injecting said microemulsion into said formation, then injecting thickened water and an aqueous drive into said formation.

29. A process for the tertiary recovery of oil from an oil-bearing formation which comprises equilibrating with formation oil to give a microemulsion a mixture according to claim 8, injecting said microemulsion into said formation, then injecting thickened water and an aqueous drive into said formation.

30. A process for the tertiary recovery of oil from an oil-bearing formation which comprises equilibrating with formation oil to give a microemulsion a mixture according to claim 9, injecting said microemulsion into said formation, then injecting thickened water and an aqueous drive into said formation.

31. A process for the tetiary recovery of oil from an oil-bearing formation which comprises equilibrating with formation oil to give a microemulsion a mixture according to claim 10, injecting said microemulsion into said formation, then injecting thickened water and an aqueous drive into said formation.

32. A system according to claim 1 wherein the copolymer is represented by the formula

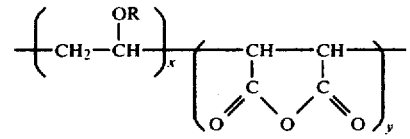

wherein x varies over the range of 5 to 50 mol percent and y varies over the range of 95 to 50 mol percent and R an alkyl group containing one to four carbon atoms.

33. A system according to claim 32 wherein the copolymer consists essentially of 1:1 alternating monomeric units of methyl vinyl ether and maleic anhydride.

34. A process for the tertiary recovery of oil from an oil-bearing formation which comprises injecting into such formation a mixture according to claim 32 and then injecting thickened water and an aqueous drive.

35. A process for the tertiary recovery of oil from an oil-bearing formation which comprises injecting into such formation a mixture according to claim 33 and then injecting thickened water and an aqueous drive.

* * * * *